US007003165B2

(12) United States Patent
Kuroda et al.

(10) Patent No.: US 7,003,165 B2
(45) Date of Patent: Feb. 21, 2006

(54) IMAGE PROCESSOR AND IMAGE PROCESSING METHOD FOR DECOMPRESSING PROGRESSIVE-CODED COMPRESSED IMAGE DATA

(75) Inventors: Manabu Kuroda, Hyogo (JP); Kazutoshi Funahashi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 595 days.

(21) Appl. No.: 09/947,361

(22) Filed: Sep. 7, 2001

(65) Prior Publication Data

US 2002/0031271 A1    Mar. 14, 2002

(30) Foreign Application Priority Data

Sep. 8, 2000  (JP) .............................. 2000-273752

(51) Int. Cl.
G06K 9/36   (2006.01)
G06K 9/46   (2006.01)

(52) U.S. Cl. ................. 382/233; 382/248; 375/240.25; 708/203

(58) Field of Classification Search ........ 382/166–233, 382/244–250; 345/555; 348/395.1, 403.1; 358/426.13, 426.14; 375/240.24, 240.25; 708/203

See application file for complete search history.

(56) References Cited

U.S. PATENT DOCUMENTS 5,838,834 A * 11/1998 Saito ........................... 382/251
6,728,471 B1 * 4/2004 Kaku ........................... 386/68

FOREIGN PATENT DOCUMENTS

JP    5-145761    6/1993
JP    5-199416    8/1993

OTHER PUBLICATIONS

Bhaskaran et al., Image and Video Compression Standards—Algorithms and Architectures, 2nd ed., 1997, pp. 149-150, 163-165.*

* cited by examiner

Primary Examiner—Bhavesh M. Mehta
Assistant Examiner—Yubin Hung
(74) Attorney, Agent, or Firm—McDermott Will & Emery LLP

(57) ABSTRACT

The image processor of the present invention includes: an extracting means, an entropy decoding means, a combining means, and an inverse orthogonal transformation means. Coded data at respective stages in a certain block are extracted by the extracting means, and entropy-decoded by the entropy-decoding means, to obtain coefficient data at the respective stages in the block. The coefficient data at the respective stages are combined by the combining means to obtain coefficient data for the block. The coefficient data is subjected to inverse orthogonal transformation by the inverse orthogonal transformation means, to attain original image data for the block. The above series of processing are performed for all blocks, to attain an original image on the entire screen. The memory capacity required for combining the coefficient data at the respective stages may only be large enough to store coefficient data for one block.

2 Claims, 13 Drawing Sheets

| BK1 | BK2 | BK3 | BK4 |
|-----|-----|-----|-----|
| BK5 | BK6 | BK7 | BK8 |
| BK9 | BK10 | BK11 | BK12 |
| BK13 | BK14 | BK15 | BK16 |

FIG. 4

| Table data, Frame header |
|---|
| Coded data in block BK1 (BK1-EC1~EC64) |
| Coded data in block BK2 (BK2-EC1~EC64) |
| Coded data in block BK3 (BK3-EC1~EC64) |
| ⁀ |
| Coded data in block BK15 (BK15-EC1~EC64) |
| Coded data in block BK16 (BK16-EC1~EC64) |

FIG. 5

| First stage | Second stage | | | Third stage | | | | |
|---|---|---|---|---|---|---|---|---|
| C1 | C2 | C6 | C7 | C15 | C16 | C28 | C29 | Fourth stage |
| C3 | C5 | C8 | C14 | C17 | C27 | C30 | C43 | |
| C4 | C9 | C13 | C18 | C26 | C31 | C42 | C44 | |
| C10 | C12 | C19 | C25 | C32 | C41 | C45 | C54 | |
| C11 | C20 | C24 | C33 | C40 | C46 | C53 | C55 | |
| C21 | C23 | C34 | C39 | C47 | C52 | C56 | C61 | Fifth stage |
| C22 | C35 | C38 | C48 | C51 | C57 | C60 | C62 | |
| C36 | C37 | C49 | C50 | C58 | C59 | C63 | C64 | |

FIG. 10

Frequency: Low → High
Frequency (vertical): Low → High

Columns: d1, d2, d3; Rows: d4, d5

| C1 | C2 | C6 | C7 |
|----|----|----|----|
| C3 | C5 | C8 |    |
| C4 | C9 |    |    |
| C10|    |    |    |

FIG. 11

Frequency: Low → High
Frequency (vertical): Low → High

Columns: d1, d2, d3; Rows: d4, d5

| C1  | C2  | C6  | C7  | C15 | C16 | C28 |
|-----|-----|-----|-----|-----|-----|-----|
| C3  | C5  | C8  | C14 | C17 | C27 |     |
| C4  | C9  | C13 | C18 | C26 |     |     |
| C10 | C12 | C19 | C25 |     |     |     |
| C11 | C20 | C24 |     |     |     |     |
| C21 | C23 |     |     |     |     |     |
| C22 |     |     |     |     |     |     |

FIG. 12

|  | d1 | | d2 | | d3 | | |
|---|---|---|---|---|---|---|---|
| C1 | C2 | C6 | C7 | C15 | C16 | C28 | C29 |
| C3 | C5 | C8 | C14 | C17 | C27 | C30 | C43 |
| C4 | C9 | C13 | C18 | C26 | C31 | C42 | C44 |
| C10 | C12 | C19 | C25 | C32 | C41 | C45 | |
| C11 | C20 | C24 | C33 | C40 | C46 | | |
| C21 | C23 | C34 | C39 | C47 | | | |
| C22 | C35 | C38 | C48 | | | | |
| C36 | C37 | C49 | | | | | |

Frequency Low → High (horizontal), Low → High (vertical); d4, d5 marked.

FIG. 13

| C1 | C2 | C6 | C7 | C15 | C16 | C28 | C29 |
|---|---|---|---|---|---|---|---|
| C3 | C5 | C8 | C14 | C17 | C27 | C30 | C43 |
| C4 | C9 | C13 | C18 | C26 | C31 | C42 | C44 |
| C10 | C12 | C19 | C25 | C32 | C41 | C45 | C54 |
| C11 | C20 | C24 | C33 | C40 | C46 | C53 | C55 |
| C21 | C23 | C34 | C39 | C47 | C52 | C56 | C61 |
| C22 | C35 | C38 | C48 | C51 | C57 | C60 | C62 |
| C36 | C37 | C49 | C50 | C58 | C59 | C63 | C64 |

IMAGE PROCESSOR AND IMAGE PROCESSING METHOD FOR DECOMPRESSING PROGRESSIVE-CODED COMPRESSED IMAGE DATA

BACKGROUND OF THE INVENTION

The present invention relates to an image processor and an image processing method, and more particularly, relates to an image processor and an image processing method for decompressing progressive-coded compressed image data.

Still image data exchanged on the Internet includes compressed image data subjected to sequential coding (sequential-coded compressed image data) and compressed image data subjected to progressive coding (progressive-coded compressed image data). In normal, terminals handling still image data exchanged on the Internet, such as personal computers (PC), are provided with an image processor capable of decompressing not only sequential-coded compressed image data but also progressive-coded compressed image data.

An image processor decompresses sequential-coded compressed image data for each block. Therefore, a final image is gradually displayed on a screen starting from the upper left of the screen to the lower right.

Progressive-coded compressed image data is decompressed in the following manner. First, coded data at the first stage among the compressed image data is decompressed. This provides a rough entire image with low resolution and gray scaling. Subsequently, coded data at the second stage among the compressed image data is decompressed, and the resultant decompressed image data is superposed on the already-obtained first-stage decompressed image data. This provides decompressed image data with resolution and gray scaling improved from those of the first-stage decompressed image data. Thereafter, the series of processing of decompressing coded data at each stage and superposing newly decompressed image data on the already-obtained decompressed image data are repeated up to final-stage coded data. As a result, in decompression of progressive-coded compressed image data, one rough entire image with low resolution and gray scaling is first displayed on a screen, and the entire image is improved in resolution and gray scaling step by step.

In the conventional image processor described above, for decompression of progressive-coded compressed image data, a memory is required for storing decompressed image data obtained by decompressing coded data at each stage. In general, the memory capacity required for storing decompressed image data obtained by decompressing compressed image data is ten times as large as the memory capacity required for storing the compressed image data.

With the recent rapid spread of the Internet, not only PCs but also small-size, lightweight portable terminals such as cellular phones now handle still image data. To ensure reduction in the size and weight of such portable terminals, the capacity of a memory required for an image processor mounted therein must be as small as possible.

SUMMARY OF THE INVENTION

An object of the present invention is providing an image processor having a reduced necessary memory capacity. According to one aspect of the present invention, the image processor is an image processor for decompressing compressed image data. The compressed image data is obtained by dividing an original image into a plurality of blocks, dividing coefficient data obtained by performing orthogonal transformation for each block into a plurality of stages, and entropy-coding the coefficient data for each stage. The image processor includes an extracting means, an entropy decoding means, a combining means, and an inverse orthogonal transformation means. The extracting means extracts coded data at respective stages in a given block from compressed image data. The entropy-decoding means entropy-decodes the coded data at the respective stages in the given block extracted by the extracting means. The combining means combines coefficient data at the respective stages in the given block obtained by the entropy-decoding means, to form coefficient data for the given block. The inverse orthogonal transformation means performs inverse orthogonal transformation for the coefficient data for the given block obtained by the combining means.

In the image processor described above, coded data at respective stages in a certain block are extracted by the extracting means, and entropy-decoded by the entropy-decoding means, to obtain coefficient data at the respective stages in the block. The coefficient data at the respective stages are combined by the combining means to obtain coefficient data for the block. The coefficient data is subjected to inverse orthogonal transformation by the inverse orthogonal transformation means, to obtain original image data for the block. The above series of processing are performed for all blocks, to attain an original image on the entire screen.

Thus, in the image processor described above, which includes the extracting means and the combining means, the memory capacity required for combining the coefficient data at the respective stages may only be large enough to store coefficient data for one block. Therefore, the necessary memory capacity can be reduced.

In addition, since inverse orthogonal transformation is performed after the combination of the coefficient data at the respective stages, the amount of operation by the inverse orthogonal transformation means can be reduced.

Preferably, the extracting means includes a detection means and a transfer means. The detection means detects the position at which the coded data at the respective stages in the given block are stored from the compressed image data. The transfer means extracts the coded data at the respective stages in the given block from the compressed image data and transfers the coded data to the entropy-decoding means.

In the image processor described above, the positions at which the coded data at the respective stages in the block are stored are detected from the compressed image data. Based on the detected positions, the coded data at the respective stages in the block are extracted from the compressed image data and transferred to the entropy-decoding means.

According to another aspect of the present invention, the image processor is an image processor for decompressing compressed image data. The compressed image data is obtained by dividing an original image into a plurality of blocks, dividing coefficient data obtained by performing orthogonal transformation for each block into a plurality of stages, and entropy-coding the coefficient data for each stage. The image processor includes a first processor, a second processor, and a common memory. The first processor has a compressed image memory for storing compressed image data. The common memory is a memory accessible from both the first processor and the second processor. The first processor transfers compressed image data stored in the compressed image memory to the common memory. The second processor detects positions at which coded data at respective stages in a certain block are stored from the compressed image data transferred to the common memory. The first processor then transfers coded data at the respective stages from the compressed image memory to the common memory based on the positions detected by the second processor. The second processor then entropy-decodes the coded data at the respective stages in the certain block transferred to the common memory, combines coefficient data at the respective stages in the certain block obtained by the entropy-decoding to form coefficient data for the certain block, and performs inverse orthogonal transformation for the coefficient data.

In the above image processor, first, the first processor transfers compressed image data stored in the compressed image memory to the common memory. Thereafter, the second processor detects the positions at which coded data at the respective stages in a certain block are stored from the compressed image data transferred to the common memory. Based on the detected positions, the first processor transfers the coded data at the respective stages from the compressed image memory to the common memory. The second processor then entropy-decodes the coded data at the respective stages in the block transferred to the common memory, combines coefficient data at the respective stages in the block obtained by the entropy decoding to form coefficient data for the block, and performs inverse orthogonal transformation for the coefficient data. The above series of processing are performed for all blocks, to attain an original image on the entire screen.

Thus, according to the image processor described above, decompression of compressed image data can be performed by two processors, that is, the first and second processors. In addition, the memory capacity required for combining the coefficient data at the respective stages may only be large enough to store coefficient data for one block. Therefore, the necessary memory capacity can be reduced.

In addition, since the second processor performs inverse orthogonal transformation after the combination of the coefficient data at the respective stages, the amount of operation required for the inverse orthogonal transformation can be reduced.

Preferably, when the first processor transfers the coded data at the respective stages from the compressed image memory to the common memory, the first processor allocates memory regions of the common memory to the coded data at the respective stages based on the data amounts of the coded data at the respective stages.

The data amount of the coded data at each stage varies with stages. In the image processor described above, the memory regions of the common memory are allocated based on the data amounts of the coded data at the respective stages.

By this allocation, the memory regions of the common memory can be effectively used.

According to yet another aspect of the present invention, the image processing method is a method for decompressing compressed image data. The compressed image data is obtained by dividing an original image into a plurality of blocks, dividing coefficient data obtained by performing orthogonal transformation for each block into a plurality of stages, and entropy-coding the coefficient data for each stage. Decompressing is performed for each block. The image processing method includes an extracting step, an entropy-decoding step, a combining step, and an inverse orthogonal transformation step. In the extracting step, coded data at respective stages for a certain block are extracted from compressed image data. In the entropy-decoding step, the coded data at the respective stages extracted in the extracting step are decoded. In the combining step, coefficient data at the respective stages obtained in the entropy-decoding step are combined, to form coefficient data for the certain block. In the inverse orthogonal transformation step, inverse orthogonal transformation is performed for the coefficient data for the certain block obtained in the combining step.

In the image processing method described above, decompression is performed for each block and includes the extracting step and the combining step. By adopting this method, therefore, the memory capacity required for combining coefficient data at the respective stages may only be large enough to store coefficient data for one block. Therefore, the necessary memory capacity can be reduced.

In addition, since inverse orthogonal transformation is performed after the combination of the coefficient data at the respective stages, the operation amount required for the inverse orthogonal transformation can be reduced.

Preferably, the image processing method described above further includes the following steps as pre-processing of the decompression for each block. Coded data at a certain stage in each of the plurality of blocks is extracted. The extracted coded data at the certain stage is entropy-decoded, and coefficient data at the certain stage obtained by the entropy decoding is subjected to inverse orthogonal transformation.

According to the image processing method described above, an image is first obtained by decompressing coded data at a certain stage in all of the plurality of blocks, and then an original image is obtained by the decompression for each block.

BRIEF DESCRIPTION OF THE DRAWINGS

FIG. 4 is an illustration of a data structure of sequential-coded compressed image data.

FIG. 5 is an illustration of DCT coefficient data divided into a plurality of stages.

FIGS. 9 through 13 illustrate how DCT coefficient data at the first to fifth stages obtained by a Huffman decoder are stored in a coefficient memory.

DESCRIPTION OF THE PREFERRED EMBODIMENTS

Figure 1:
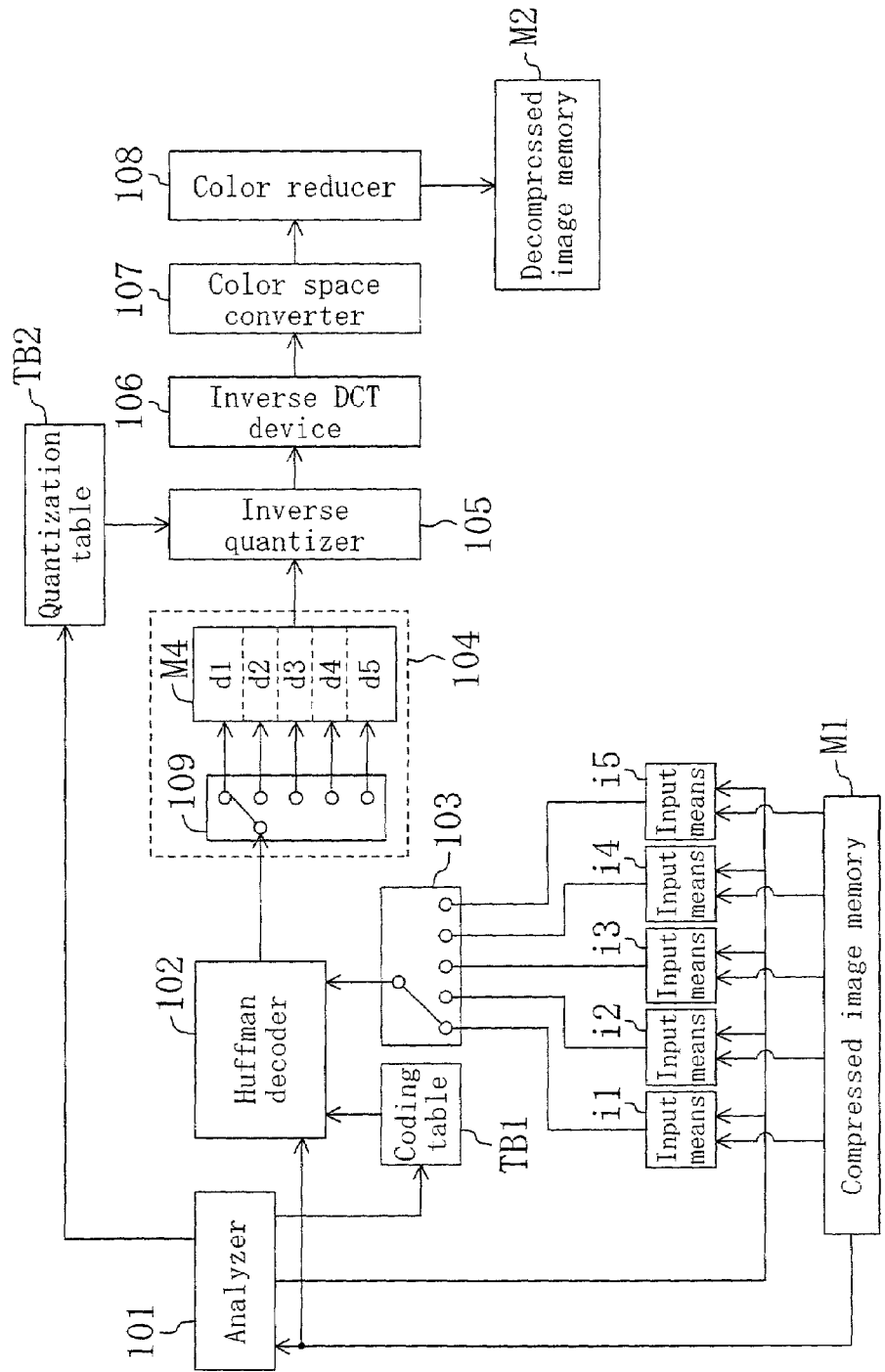
FIG. 1 is a block diagram of the entire construction of an image processor of Embodiment 1 of the present invention.

Hereinafter, preferred embodiments of the present invention will be described in detain with reference to the accompanying drawings. Note that the same or like components are denoted by the same reference numerals, and the description thereof is not repeated.

(Embodiment 1)

<Entire Construction>

FIG. 1 is a block diagram of the entire construction of an image processor of Embodiment 1 of the present invention. Referring to FIG. 1, the image processor includes: an analyzer 101, a Huffman decoder 102, a selector 103, a combiner 104, an inverse quantizer 105, an inverse DCT device 106, a color space converter 107, a color reducer 108, input means i1 to i5, a coding table TB1, a quantization table TB2, a compressed image memory M1, and a decompressed image memory M2.

The compressed image memory M1 is a memory for storing compressed image data.

The analyzer 101 analyzes a header of compressed image data stored in the compressed image memory M1 to acquire information required for decompression, such as a coding scheme, a quantization value, and a Huffman table. The analyzer 101 then transfers the Huffman table to the coding table TB1 and the quantization value to the quantization table TB2. In addition, when the compressed image data stored in the compressed image memory M1 is sequential-coded data, the analyzer 101 transfers the coded data to the Huffman decoder 102. When the compressed image data stored in the compressed image memory M1 is progressive-coded data, the analyzer 101 detects the positions at which coded data at respective stages are stored and outputs the information on the positions to the input means i1 to i5.

The input means i1 to i5 extract the coded data at the respective stages stored in the compressed image memory M1 based on the positional information from the analyzer 101, and supply the coded data to the selector 103.

The selector 103 selectively supplies the coded data at the respective stages from the input means i1 to i5 to the Huffman decoder 102.

The Huffman decoder 102 Huffman-decodes the coded data supplied from the analyzer 101 or the selector 103 with reference to the Huffman table stored in the coding table TB1.

The combiner 104 includes a selector 109 and a coefficient memory M4. The coefficient memory M4 includes memory regions d1 to d5. The selector 109 selectively transfers DCT coefficient data from the Huffman decoder 102 to the memory regions d1 to d5 of the coefficient memory M4. The coefficient memory M4 outputs the DCT coefficient data stored in the memory regions d1 to d5 to the inverse quantizer 105.

The inverse quantizer 105 inverse-quantizes the DCT coefficient data from the coefficient memory M4 of the combiner 104 with reference to the quantization value stored in the quantization table TB2.

The inverse DCT device 106 performs inverse DCT for the inverse-quantized DCT coefficient data from the inverse quantizer 105.

The color space converter 107 converts the components of the color space of the decompressed image data from the inverse DCT device 106 from luminance components and color-difference components (Y, U, V) to the three primary color components (R, G, B).

The color reducer 108 reduces the number of colors of the decompressed image data from the color space converter 107.

The decompressed image memory M2 is a memory for storing the decompressed image data of which the number of colors has been reduced by the color reducer 108.

<Compressed Image Data>

The compressed image data stored in the compressed image memory M1 shown in FIG. 1 will be described. The compressed image data include sequential-coded compressed image data and progressive-coded compressed image data. These compressed image data have been compressed by subjecting an original image to the following processing.

(a) Sequential-Coded Compressed Image Data

Figures 2, 3:
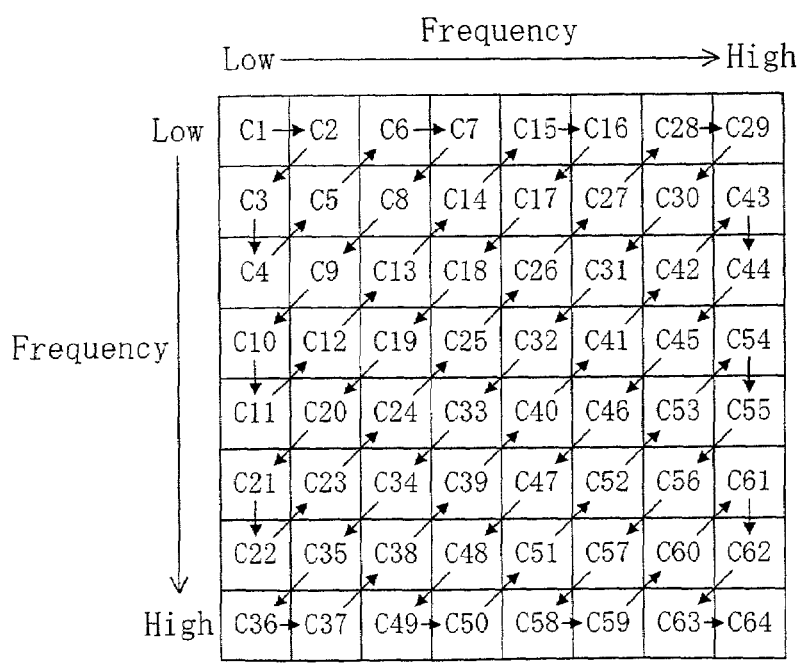
FIG. 2 is an illustration of an original image divided into a plurality of blocks.
FIG. 3 is an illustration of DCT coefficient data obtained by discrete cosine transformation (DCT).

First, as shown in FIG. 2, an original image is divided into a plurality of blocks BK1 to BK16. Each block BKi (i=1 to 16), which is composed of 8×8 pixels, is subjected to a series of processing (1) to (4) below.

(1) Color Space Conversion

The components of the color space of image data in the block BKi are converted from the three primary color components (R, G, B) to luminance components and color-difference components (Y, U, V).

(2) DCT

The color space-converted image data in the block BKi is subjected to discrete cosine transformation (DCT), to obtain DCT coefficient data C1 to C64 as shown in FIG. 3.

(3) Quantization

The DCT coefficient data C1 to C64 are quantized based on a quantization value stored in a quantization table.

(4) Huffman Coding

The quantized DCT coefficient data are Huffman-coded in the order of zigzag scanning (in ascending order of frequency), that is, in the order from the DCT coefficient data C1 up to the DCT coefficient data C64, to obtain coded data for the block BKi.

The series of processing (1) to (4) are performed for all the blocks BK1 to BK16, to attain compressed image data as shown in FIG. 4. The compressed image data shown in FIG. 4 includes table data (Huffman table, quantization value), a frame header, and coded data for the respective blocks BKi-EC1 to EC64 (i=1 to 16). The frame header includes information indicating the coding scheme of the compressed image data (sequential-coded data or progressive-coded data).

(b) Progressive-Coded Compressed Image Data

First, as described above for the sequential-coded compressed image data, an original image is divided into a plurality of blocks BK1 to BK16. Each block BKi (i=1 to 16) is subjected to a series of processing (1) to (4) below.

(1) Color Space Conversion

The components of the color space of image data in the block BKi are converted from the three primary color components (R, G, B) to luminance components and color-difference components (Y, U, V).

(2) DCT

The color space-converted image data in the block BKi is subjected to DCT, to obtain DCT coefficient data C1 to C64 as shown in FIG. 3.

(3) Quantization

The DCT coefficient data C1 to C64 are quantized based on a quantization value stored in a quantization table. The quantized DCT coefficient data are then divided into a plurality of stages (first to fifth stages) based on the frequency. Specifically, as shown in FIG. 5, the DCT coefficient data C1 to C64 are divided into the first stage (C1), the second stage (C2 to C10), the third stage (C11 to C28), the fourth stage (C29 to C49), and the fifth stage (C50 to C64)

(4) Huffman Coding

The quantized DCT coefficient data are Huffman-coded for each stage, to obtain first-stage to fifth-stage coded data.

Figure 6:
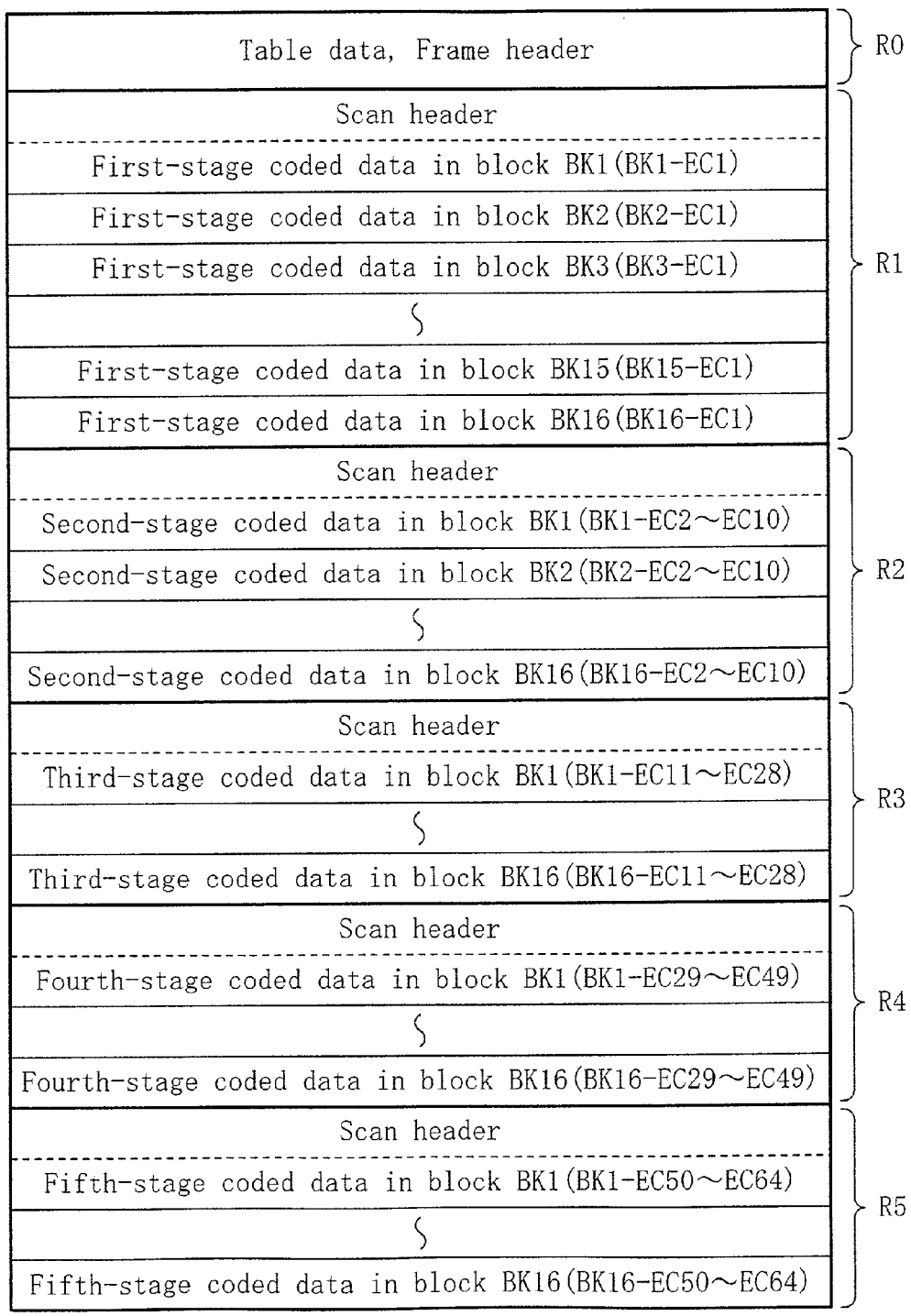
FIG. 6 is an illustration of a data structure of progressive-coded compressed image data.

The series of processing (1) to (4) are performed for all the blocks BK1 to BK16, to obtain compressed image data as shown in FIG. 6. The compressed image data shown in FIG. 6 includes data R0 including table data (Huffman table, quantization value), a frame header, and the like and first-stage to fifth-stage Data R1 to R5. The frame header includes information indicating the coding scheme of the compressed image data (sequential-coded data or progressive-coded data).

The first-stage data R1 includes a first-stage scan header and first-stage coded data EC1 in the blocks BK1 to BK16. The second-stage data R2 includes a second-stage scan header and second-stage coded data EC2 to EC10 in the blocks BK1 to BK16. The third-stage data R3 includes a third-stage scan header and third-stage coded data EC11 to EC28 in the blocks BK1 to BK16. The fourth-stage data R4 includes a fourth-stage scan header and fourth-stage coded data EC29 to EC49 in the blocks BK1 to BK16. The fifth-stage data R5 includes a fifth-stage scan header and fifth-stage coded data EC50 to EC64 in the blocks BK1 to BK16.

<Decompression>

Decompression by the image processor shown in FIG. 1 will be described separately for (a) progressive-coded compressed image data and (b) sequential-coded compressed image data.

(a) Decompression of Progressive-Coded Compressed Image

Figure 7:
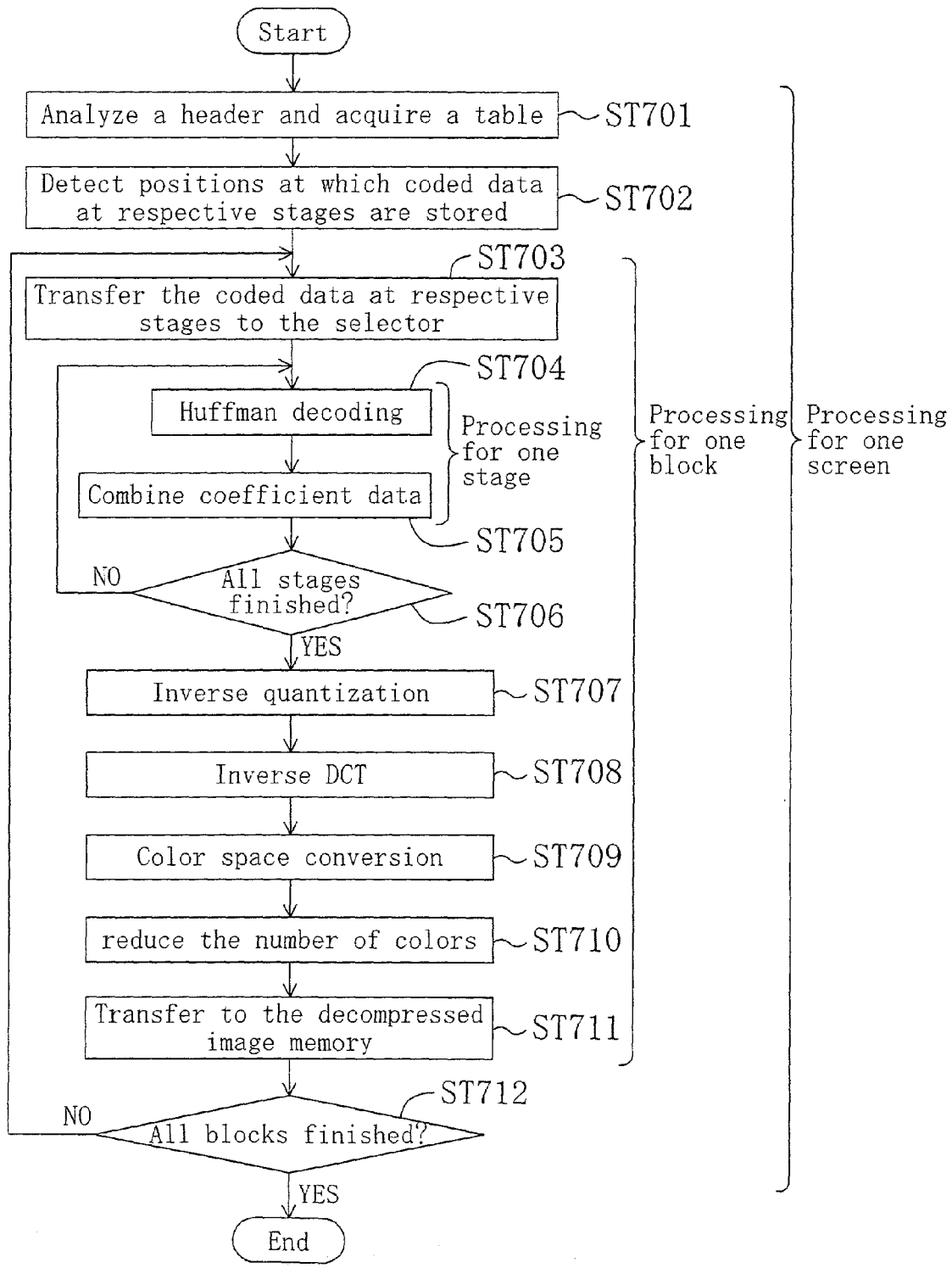
FIG. 7 is a flowchart showing a procedure of decompression of progressive-coded compressed image data.

FIG. 7 is a flowchart showing a procedure of decompression of progressive-coded compressed image data. Hereinafter, the procedure is described with reference to FIG. 7 together with FIG. 1.

First, in step ST701, the analyzer 101 analyzes the frame header of the compressed image data (see FIG. 6) stored in the compressed image memory M1, to obtain information such as the coding scheme (progressive-coding or sequential-coding) and the image size. The compressed image data is thus identified as progressive-coded data in this case. The analyzer 101 also extracts a quantization value and a Huffman table from the table data of the compressed image data (see FIG. 6), and transfers the quantization value to the quantization table TB2 and the Huffman table to the coding table TB1.

Figure 8:
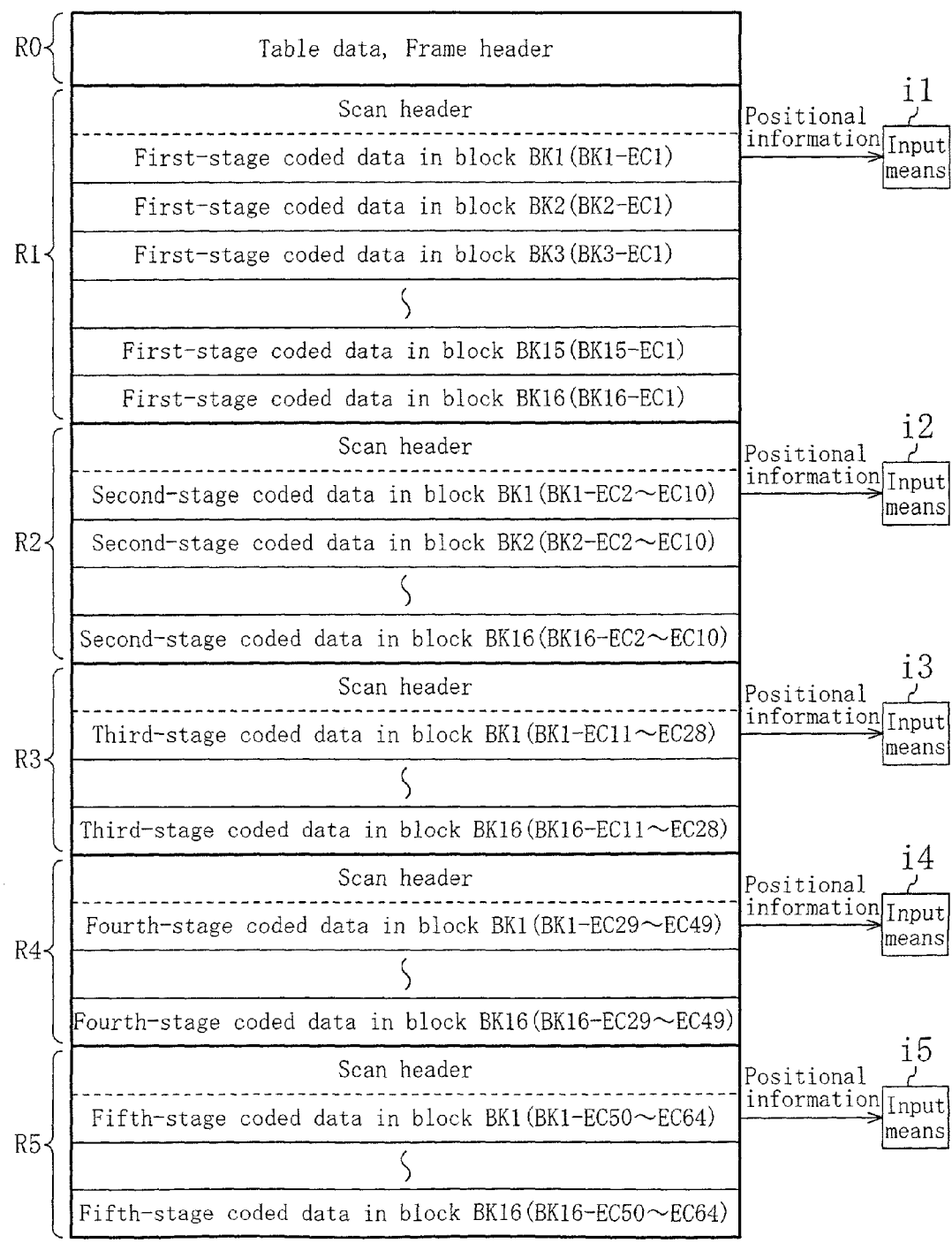
FIG. 8 is a view showing how information units on positions at which coded data at respective stages are stored are provided to corresponding input means.

In step ST702, the analyzer 101 identifies the scan header at each stage of the compressed image data (see FIG. 6) to detect the position at which coded data at each stage in the block BK1 is stored. Specifically, the analyzer 101 detects positional information indicating the number of bytes from the head of the compressed image data at which the first-stage coded data in the block BK1 starts, the number of bytes from the head of the compressed image data at which the second-stage coded data in the block BK1 starts, the number of bytes from the head of the compressed image data at which the third-stage coded data in the block BK1 starts, the number of bytes from the head of the compressed image data at which the fourth-stage coded data in the block BK1 starts, and the number of bytes from the head of the compressed image data at which the fifth-stage coded data in the block BK1 starts. The analyzer 101 then outputs the positional information units on the heads of the first-stage to fifth-stage coded data to the input means i1 to i5, respectively, as shown in FIG. 8.

In step ST703, the input means i1 to i5 extract the first-stage to fifth-stage coded data in the block BK1 from the compressed image memory M1 based on the positional information from the analyzer 101, and transfer the extracted data to the selector 103. The analyzer 101 increments the positional information by the number of bytes of the coded data transferred to the selector 103. By this increment, the positional information given next to each of the input means i1 to i5 indicates the number of bytes from the head of the compressed image data at which the coded data at each stage in the block BK2 as the next block starts.

In step ST704, the selector 103 supplies the first-stage coded data in the block BK1 (BK1-EC1) output from the input means i1 to the Huffman decoder 102. The Huffman decoder 102 Huffman-decodes the first-stage coded data in the block BK1 (BK1-EC1) with reference to the Huffman table stored in the coding table TB1. By this decoding, first-stage DCT coefficient data in the block BK1 (BK1-C1) is obtained.

Figure 9:
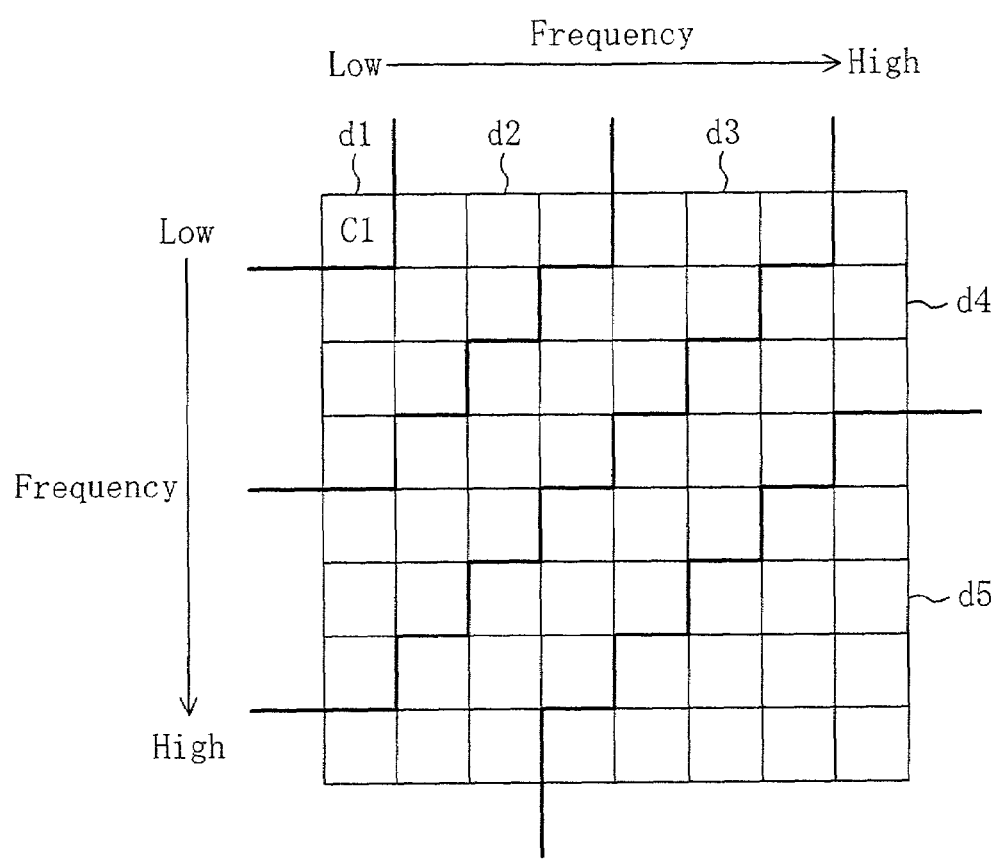

In step ST705, the selector 109 of the combiner 104 transfers the first-stage DCT coefficient data in the block BK1 (BK1-C1) from the Huffman decoder 102 to the memory region d1 of the coefficient memory M4. As shown in FIG. 9, the coefficient memory M4 has a capacity permitting storage of 8×8 units of DCT coefficient data. First-stage DCT coefficient data is stored in the memory region d1, second-stage DCT coefficient data is stored in the memory region d2, third-stage DCT coefficient data is stored in the memory region d3, fourth-stage DCT coefficient data is stored in the memory region d4, and fifth-stage DCT coefficient data is stored in the memory region d5. The first-stage DCT coefficient data in the block BK1 (BK1-C1) is thus stored in the memory region d1 as shown in FIG. 9.

In step ST706, whether or not DCT coefficient data at all stages in the block BK1 have been stored in the coefficient memory M4 is determined. If DCT coefficient data at all stages have been stored, the process proceeds to step ST707. Otherwise, the process returns to step ST704. In this case, since DCT coefficient data at all stages have not yet been stored, the process returns to step ST704.

In step ST704, the selector 103 supplies the second-stage coded data in the block BK1 (BK1-EC2 to EC10) output from the input means i2 to the Huffman decoder 102. The Huffman decoder 102 Huffman-decodes the second-stage coded data in the block BK1 (BK1-EC2 to EC10) with reference to the Huffman table stored in the coding table TB1. By this decoding, second-stage DCT coefficient data in the block BK1 (BK1-C2 to C10) are obtained.

In step ST705, the selector 109 of the combiner 104 transfers the second-stage DCT coefficient data in the block BK1 (BK1-C2 to C10) from the Huffman decoder 102 to the memory region d2 of the coefficient memory M4. The second-stage DCT coefficient data in the block BK1 (BK1-C2 to C10) are stored in the memory region d2 in the order of zigzag scanning as shown in FIG. 10.

The process again returns to step ST704 as a result of the determination in step ST706.

In step ST704, the selector 103 supplies the third-stage coded data in the block BK1 (BK1-EC11 to EC28) output from the input means i3 to the Huffman decoder 102. The Huffman decoder 102 Huffman-decodes the third-stage coded data in the block BK1 (BK1-EC11 to EC28) with reference to the Huffman table stored in the coding table TB1. By this decoding, third-stage DCT coefficient data in the block BK1 (BK1-C11 to C28) are obtained.

In step ST705, the selector 109 of the combiner 104 transfers the third-stage DCT coefficient data in the block BK1 (BK1-C11 to C28) from the Huffman decoder 102 to the memory region d3 of the coefficient memory M4. The third-stage DCT coefficient data in the block BK1 (BK1-C11 to C28) are stored in the memory region d3 in the order of zigzag scanning as shown in FIG. 11. The process again returns to step ST704 as a result of the determination in step ST706.

In step ST704, the selector 103 supplies the fourth-stage coded data in the block BK1 (BK1-EC29 to EC49) output from the input means i4 to the Huffman decoder 102. The Huffman decoder 102 Huffman-decodes the fourth-stage coded data in the block BK1 (BK1-EC29 to EC49) with reference to the Huffman table stored in the coding table TB1. By this decoding, fourth-stage DCT coefficient data in the block BK1 (BK1-C29 to C49) are obtained.

In step ST705, the selector 109 of the combiner 104 transfers the fourth-stage DCT coefficient data in the block BK1 (BK1-C29 to C49) from the Huffman decoder 102 to the memory region d4 of the coefficient memory M4. The fourth-stage DCT coefficient data in the block BK1 (BK1-C29 to C49) are stored in the memory region d4 in the order of zigzag scanning as shown in FIG. 12. The process again returns to step ST704 as a result of the determination in step ST706.

In step ST704, the selector 103 supplies the fifth-stage coded data in the block BK1 (BK1-EC50 to EC64) output from the input means i5 to the Huffman decoder 102. The Huffman decoder 102 Huffman-decodes the fifth-stage coded data in the block BK1 (BK1-EC50 to EC64) with reference to the Huffman table stored in the coding table TB1. By this decoding, fifth-stage DCT coefficient data in the block BK1 (BK1-C50 to C64) are obtained.

In step ST705, the selector 109 of the combiner 104 transfers the fifth-stage DCT coefficient data in the block BK1 (BK1-C50 to C64) from the Huffman decoder 102 to the memory region d5 of the coefficient memory M4. The fifth-stage DCT coefficient data in the block BK1 (BK1-C50 to C64) are stored in the memory region d5 in the order of zigzag scanning as shown in FIG. 13. As a result, 8×8 DCT coefficient data C1 to C64 arranged in the order of zigzag scanning are obtained.

In this embodiment, the DCT coefficient data at the respective stages were stored in the corresponding memory regions d1 to d5 in the order of zigzag scanning. Alternatively, the DCT coefficient data C1 to C64 may be sorted in the order described in FIG. 13 once the DCT coefficient data at all stages have been stored.

In the manner described above, the DCT coefficient data C1 to C64 in the block BK1 are attained. The process then proceeds to step ST707 as a result of the determination in step ST706.

In step ST707, the inverse quantizer 105 inverse-quantizes the DCT coefficient data C1 to C64 in the block BK1 supplied from the combiner 104 based on the quantization value stored in the quantization table TB2.

In step ST708, the inverse DCT device 106 performs inverse DCT for the DCT coefficient data C1 to C64 in the block BK1 inverse-quantized by the inverse-quantizer 105. Thus, decompressed image data for the block BK1 is attained.

In step ST709, the color space converter 107 converts the components of the color space of the decompressed image data in the block BK1 supplied from the inverse DCT device 106 from the luminance components and the color-difference components (Y, U, V) to the three primary components (R, G, B).

In step ST710, the color reducer 108 reduces the number of colors of the decompressed image data in the block BK1. In this processing, a technique such as error dispersion is employed so that the difference in the appearance of an image is less conspicuous between before and after the reduction of the number of colors. Many of small-size display terminals such as cellular phones can only display an image with low resolution and reduced color information. The color reducer 108 is therefore required for an image processor mounted in such a small-size terminal.

In step ST711, the decompressed image data in the block BK1 from the color reducer 108 is stored in the decompressed image memory M2.

In step ST712, whether or not decompressed image data in all blocks BK1 to BK16 have been stored in the decompressed image memory M2 is determined. If decompressed image data in all blocks BK1 to BK16 have been stored, the process is terminated. Otherwise, the process returns to step ST703. In this case, since decompressed image data in the blocks BK2 to BK16 have not yet been stored, the process returns to step ST703.

In step ST703, the input means i1 to i5 extract the first-stage to fifth-stage coded data in the block BK2 from the compressed image memory M1 based on the positional information from the analyzer 101, and transfer the data to the selector 103. The analyzer 101 increments the positional information by the number of bytes of the coded data transferred to the selector 103. By this increment, the positional information given next to each of the input means i1 to i5 indicates the number of bytes from the head of the compressed image data at which the coded data at each stage in the block BK3 as the next block starts. Subsequently, the series of processing described above in relation with the block BK1 are performed, and decompressed image data in the block BK2 is stored in the decompressed image memory M2. The process returns to step ST703 again as a result of the determination in step ST712.

For the blocks BK3 to BK16, substantially the same series of processing as those for the blocks BK1 and BK2 described above are performed, and decompressed image data in blocks BK3 to BK16 are stored in the decompressed image memory M2. The process is then terminated as a result of the determination in step ST712.

Decompressed image data of the progressive-coded compressed image data is thus obtained. In the display of the decompressed image data, as in the display of decompressed image data of sequential-coded compressed image data, the decompressed image data in the blocks BK1 to BK16 are sequentially displayed.

When the user views an image on the Internet via a terminal such as a PC, the user often waits staring at the display screen until the entire image is displayed. Therefore, when progressive-coded compressed image data is decompressed, decompressed image data at the respective stages are sequentially displayed so that the user can seize the outline of the image while he or she is waiting for appearance of the image.

However, when a small-type terminal such as a cellular phone is used, the user hardly waits staring at the display screen until an image is displayed. Therefore, when progressive-coded compressed image data is decompressed, sequential display of decompressed image data at the respective stages is not necessarily required. It is rather desired to reduce as much as possible the memory capacity required for an image processor mounted in a small-type terminal such as a cellular phone.

According to the image processor of Embodiment 1, progressive-coded compressed image data can be decompressed for each block. Therefore, the memory M4 required for combining DCT coefficient data at the respective stages may have only a capacity large enough to store DCT coefficient data for one block. With this small memory capacity requirement, the image processor of this embodiment can be used as an image processor mounted in small-type portable terminals such as cellular phones. It is needless to mention that the image processor of this embodiment can also be used as an image processor for other apparatus.

(b) Decompression of Sequential-Coded Compressed Image

Figure 14:
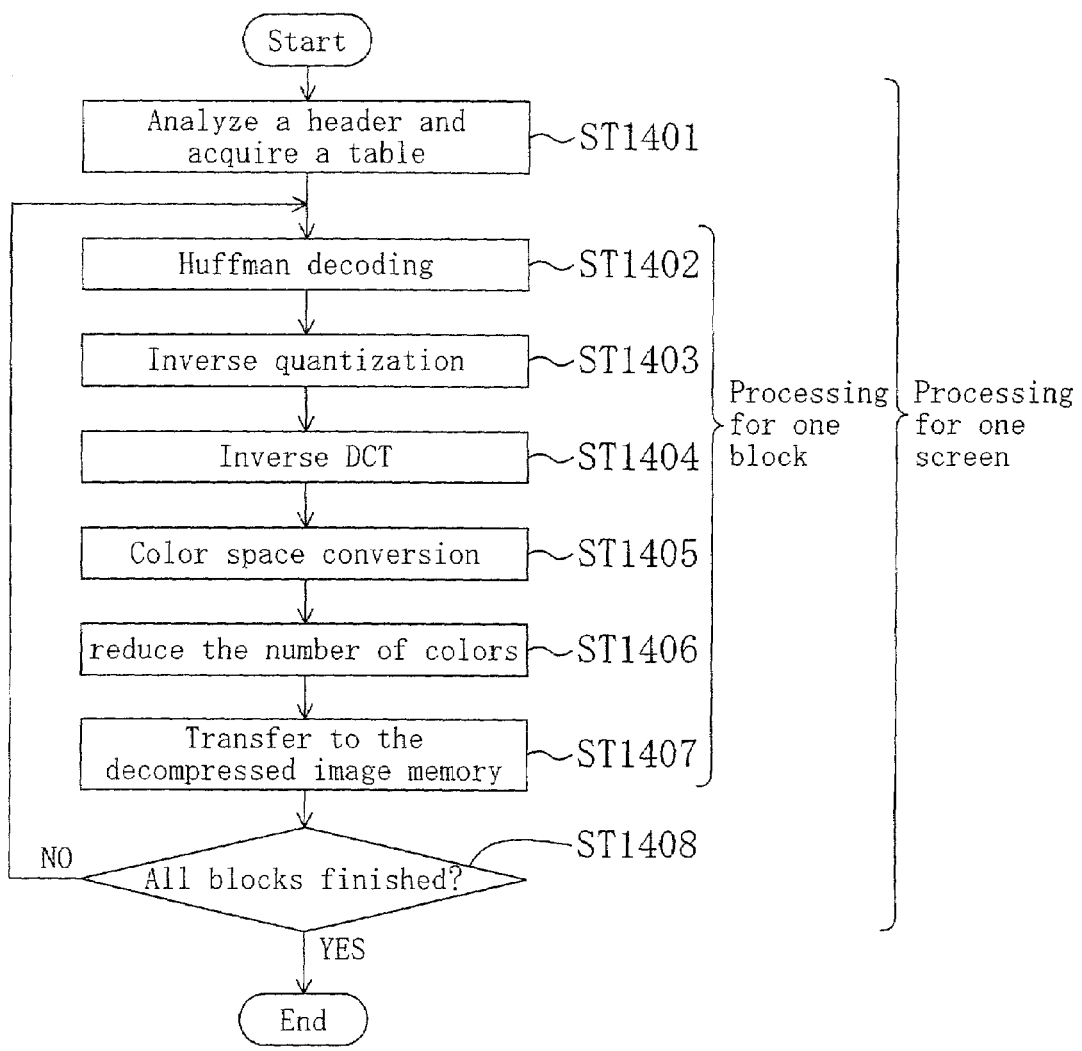
FIG. 14 is a flowchart showing a procedure of decompression of sequential-coded compressed image data.

FIG. 14 is a flowchart showing a procedure of decompression of sequential-coded compressed image data. Hereinafter, the procedure is described with reference to FIG. 14 together with FIG. 1.

First, in step ST1401, the analyzer 101 analyzes the frame header of the compressed image data (see FIG. 4) stored in the compressed image memory M1, to obtain information such as the coding scheme (progressive-coding or sequential-coding) and the image size. The compressed image data is thus identified as sequential-coded data in this case. The analyzer 101 also extracts a quantization value and a Huffman table from the table data of the compressed image data (see FIG. 4), and transfers the quantization value to the quantization table TB2 and the Huffman table to the coding table TB1.

In step ST1402, the analyzer 101 supplies coded data in the block BK1 (BK1-EC1 to EC64) to the Huffman decoder 102. The Huffman decoder 102 Huffman-decodes the coded data in the block BK1 (BK1-EC1 to EC64) with reference to the Huffman table stored in the coding table TB1. By this decoding, DCT coefficient data in the block BK1 (BK1-C1 to C64) are obtained.

In step ST1403, the selector 109 of the combiner 104 sequentially transfers the DCT coefficient data in the block BK1 (BK1-C1 to C64) to the memory regions d1 to d5 of the coefficient memory M4. The inverse quantizer 105 inverse-quantizes the DCT coefficient data in the block BK1 (BK1-C1 to C64) from the coefficient memory M4 based on the quantization value stored in the quantization table TB2.

In step ST1404, the inverse DCT device 106 performs inverse DCT for the DCT coefficient data in the block BK1 (BK1-C1 to C64) inverse-quantized by the inverse quantizer 105. Thus, decompressed image data in the block BK1 is attained.

In step ST1405, the color space converter 107 converts the components of the color space of the decompressed image data in the block BK1 supplied from the inverse DCT device 106 from the luminance components and the color-difference components (Y, U, V) to the three primary components (R, G, B).

In step ST1406, the color reducer 108 reduces the number of colors of the decompressed image data in the block BK1. In this processing, a technique such as error dispersion is employed so that the difference in the appearance of an image is less conspicuous between before and after the reduction of the number of colors.

In step ST1407, the decompressed image data in the block BK1 from the color reducer 108 is stored in the decompressed image memory M2.

In step ST1408, whether or not decompressed image data in all blocks BK1 to BK16 have been stored in the decompressed image memory M2 is determined. If decompressed image data in all blocks BK1 to BK16 have been stored, the process is terminated. Otherwise, the process returns to step ST1402. In this case, since decompressed image data in the blocks BK2 to BK16 have not yet been stored, the process returns to step ST1402. By performing substantially the same series of processing as those for the block BK1 described above, decompressed image data in the blocks BK2 to BK16 are stored in the decompressed image memory M2.

Decompressed image data of the sequential-coded compressed image data is thus obtained.

<Effect>

As described above, the image processor of Embodiment 1 of the present invention, which is provided with the analyzer 101, the input means i1 to i5, the selector 103, and the combiner 104, can decompress progressive-coded compressed image data for each block. The capacity of the memory M4 required for combining DCT coefficient data at the respective stages may only be large enough to store DCT coefficient data for one block. With this small memory capacity requirement, the image processor of this embodiment can be used as an image processor mounted in small-type portable terminals such as cellular phones.

Inverse DCT is performed after the combination of the DCT coefficient data at the respective stages. This reduces the operation amount of the inverse DCT.

In this embodiment, DCT/inverse DCT was adopted as orthogonal transformation/inverse orthogonal transformation, and Huffman coding/decoding was adopted as entropy coding/decoding. Alternatively, other schemes of orthogonal transformation/inverse orthogonal transformation and entropy coding/decoding may be adopted.

In this embodiment, as the method for implementing progressive coding, quantized DCT coefficient data were divided into a plurality of stages based on the frequency. Alternatively, other implementing methods may be employed. For example, bits of quantized DCT coefficient data may be divided into a plurality of stages.

The image processor of Embodiment 1 may not necessarily be constructed by hardware, but can be implemented by software.

The following pre-processing may be performed prior to the decompression for each block in steps ST702 to ST712. By this pre-processing, it is possible to first display image data obtained by decompressing the first-stage coded data in the blocks BK1 to BK16 (rough entire image with low resolution and low gray scaling), and then display decompressed image data obtained by completing the decompression for each block in steps ST702 to ST712.

<Pretreatment>

First, the analyzer 101 supplies first-stage coded data (EC1) in the blocks BK1 to BK16 to the Huffman decoder 102. The Huffman decoder 102 Huffman-decodes the first-stage coded data (EC1) in the blocks BK1 to BK16 with reference to the Huffman table stored in the coding table TB1. By this decoding, first-stage DCT coefficient data C1 in the blocks BK1 to BK16 are provided.

The combiner 104 sequentially transfers the resultant first-stage DCT coefficient data C1 in the blocks BK1 to BK16 to the inverse quantizer 105. The inverse quantizer 105 inverse-quantizes the first-stage DCT coefficient data C1 in the blocks BK1 to BK16 based on the quantization value stored in the quantization table TB2.

The inverse DCT device 106 performs inverse DCT for the first-stage DCT coefficient data C1 in the blocks BK1 to BK16 inverse-quantized by the inverse quantizer 105. By this processing, first-stage decompressed image data in the blocks BK1 to BK16 are provided.

The color space converter 107 converts the components of the color space of the first-stage decompressed image data in the blocks BK1 to BK16 subjected to inverse DCT, from the luminance components and the color-difference components (Y, U, V) to the three primary components (R, G, B).

The color reducer 108 reduces the number of colors of the first-stage decompressed image data in the blocks BK1 to BK16. The first-stage decompressed image data in the blocks BK1 to BK16 from the color reducer 108 are stored in the decompressed image memory M2.

Thus, decompressed image data of the first-stage coded data covering the blocks BK1 to BK16 is obtained.

(Embodiment 2)

<Entire Construction>

Figure 15:
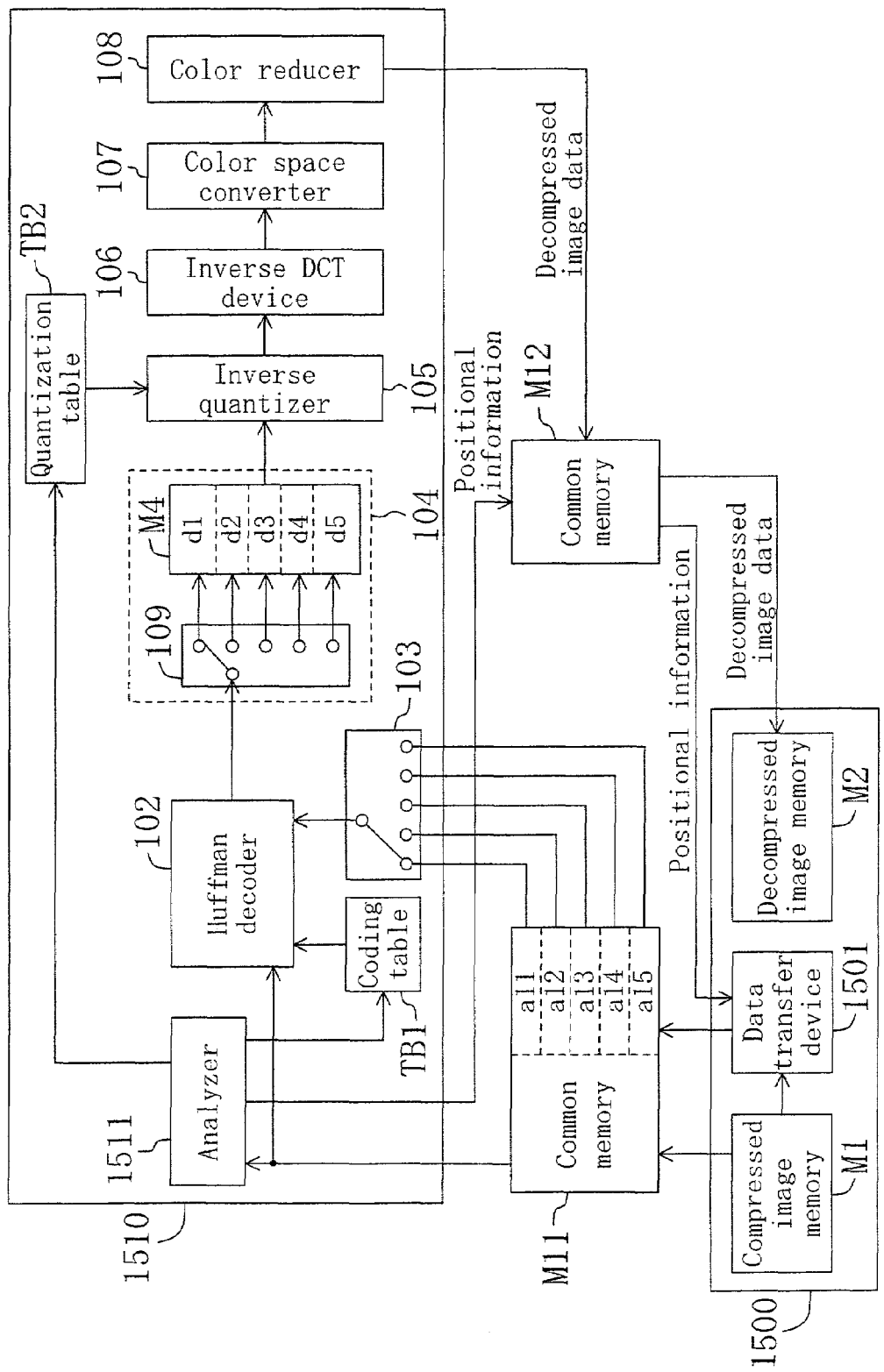
FIG. 15 is a block diagram of the entire construction of an image processor of Embodiment 2 of the present invention.

FIG. 15 is a block diagram of the entire construction of an image processor of Embodiment 2 of the present invention. Referring to FIG. 15, the image processor includes a CPU 1500, a digital signal processor (DSP) 1510, and common memories M11 and M12.

The CPU 1500 includes a compressed image memory M1, a data transfer device 1501, and a decompressed image memory M2. The data transfer device 1501 transfers coded data at each stage from the compressed image memory M1 to the common memory M11 based on positional information stored in the common memory M12.

The common memories M11 and M12 are accessible from both the CPU 1500 and the DSP 1510. The common memory M11 stores coded data sent from the compressed image memory M1 and coded data at respective stages transferred by the data transfer device 1501. The latter coded data at respective stages from the data transfer device 1501 are stored in memory regions a11 to a15. The common memory M12 stores positional information detected by an analyzer 1511 and decompressed image data sent from a color reducer 108.

The DSP 1510 includes the analyzer 1511, a Huffman decoder 102, a selector 103, a combiner 104, an inverse quantizer 105, an inverse DCT device 106, a color space converter 107, the color reducer 108, a coding table TB1, and a quantization table TB2. The combiner 104 includes a selector 109 and a coefficient memory M4.

The analyzer 1511 analyzes a header of compressed image data stored in the common memory M11 to acquire information required for decompression, such as a coding scheme, a quantization value, and a Huffman table. The analyzer 1511 transfers the Huffman table to the coding table TB1 and the quantization value to the quantization table TB2. In addition, when the compressed image data stored in the common memory M11 is sequential-coded data, the analyzer 1511 transfers the coded data to the Huffman decoder 102. When the compressed image data stored in the common memory M11 is progressive-coded data, the analyzer 1511 detects the positions at which coded data at respective stages are stored and outputs the information on the positions to the common memory M12.

<Decompression>

Decompression by the image processor shown in FIG. 15 will be described separately for (a) progressive-coded compressed image data and (b) sequential-coded compressed image data. Note that the structures of the compressed image data (a) and (b) are substantially the same as those shown in FIGS. 4 and 6, respectively.

(a) Decompression of Progressive-Coded Compressed Image

Figure 16:
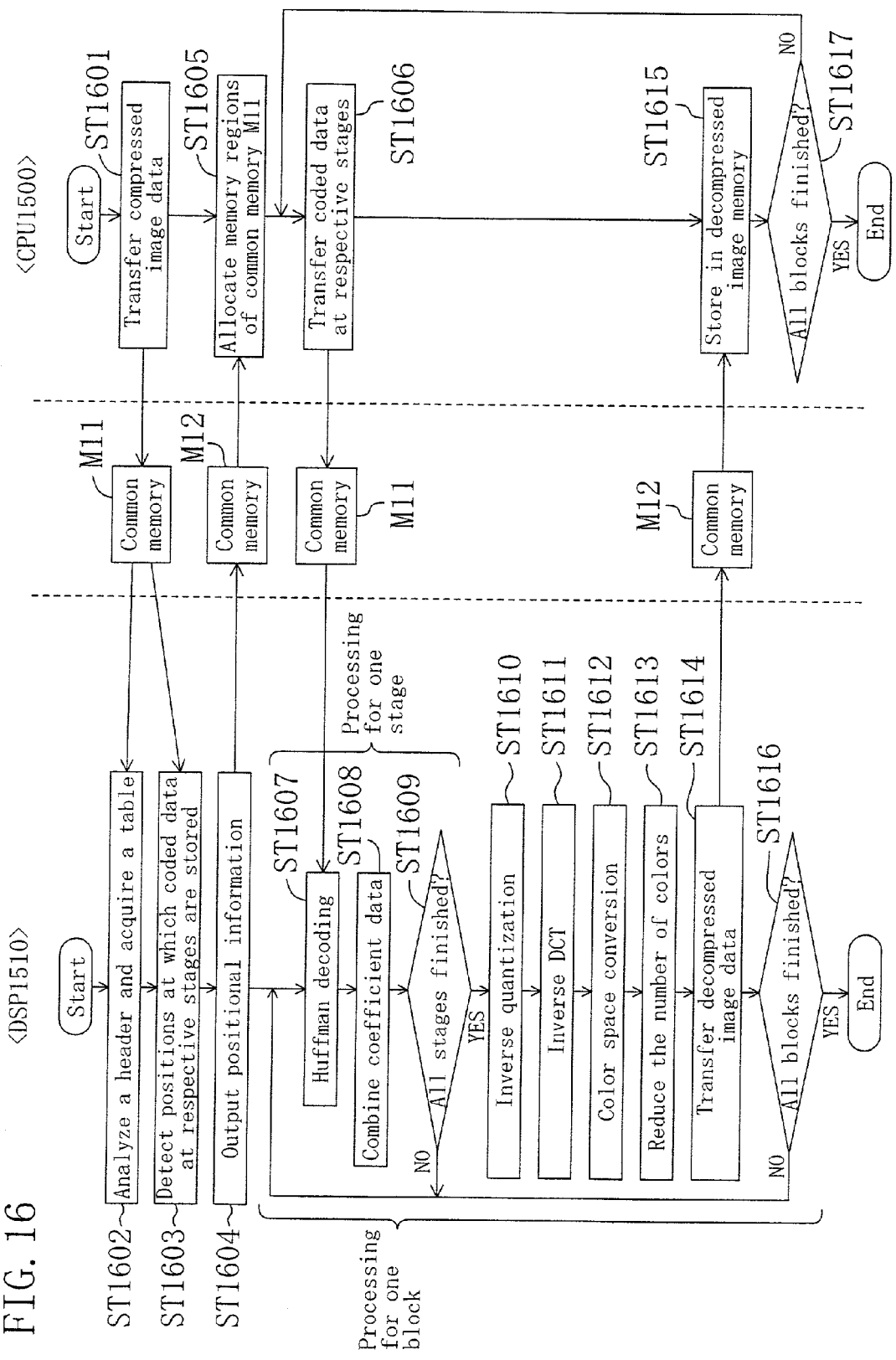
FIG. 16 is a flowchart showing a procedure of decompression of progressive-coded compressed image data.

FIG. 16 is a flowchart showing a procedure of decompression of progressive-coded compressed image data. Note that steps ST1601, ST1605, ST1606, ST1615, and ST1617 belong to processing executed in the CPU 1500, while steps ST1602 to ST1604, ST1607 to ST1614, and ST1616 belong to processing executed in the DSP 1510.

The CPU 1500 retrieves compressed image data externally (by accessing the Internet, for example), and stores the data in the compressed image memory M1.

In step ST1601, the CPU 1500 transfers the compressed image data stored in the compressed image memory M1 to the common memory M11.

In step ST1602, the analyzer 1511 analyzes the frame header of the compressed image data (see FIG. 6) stored in the common memory M11, to acquire information such as the coding scheme (progressive-coding or sequential-coding) and the image size. The compressed image data is thus identified as progressive-coded data in this case. The analyzer 1511 also extracts a quantization value and a Huffman table from the table data of the compressed image data (see FIG. 6), and transfers the quantization value to the quantization table TB2 and the Huffman table to the coding table TB1.

In step ST1603, the analyzer 1511 identifies the scan header at each stage of the compressed image data (see FIG. 6) to detect the position at which coded data at each stage is stored. Specifically, the analyzer 1511 detects positional information indicating the number of bytes from the head of the compressed image data at which the first-stage coded data in the block BK1 starts, the number of bytes from the head of the compressed image data at which the second-stage coded data in the block BK1 starts, the number of bytes from the head of the compressed image data at which the third-stage coded data in the block BK1 starts, the number of bytes from the head of the compressed image data at which the fourth-stage coded data in the block BK1 starts, and the number of bytes from the head of the compressed image data at which the fifth-stage coded data in the block BK1 starts.

Note that the CPU 1500 does not have to transfer all the compressed image data stored in the compressed image memory M1 to the common memory M11 in step ST1601. Instead, only a predetermined amount of data from the head may be transferred to the common memory M11 first, and then, for data for which positional information has been detected in step ST1603, the common memory M11 may be appropriately replenished with next data.

Upon completion of the detection of the positions at which coded data at the respective stages are stored, the analyzer 1511 outputs the detected positional information to the common memory M12.

In step ST1605, the CPU 1500 estimates the amounts of coded data at the respective stages based on the positional information stored in the common memory M12, and allocates memory regions a11 to a15 in the common memory M11 based on the estimated data amounts. The data amount of the progressive-coded data at each stage varies with stages. Therefore, if the memory regions a11 to a15 of the common memory M11 are allocated to have an equal size, effective use of the common memory M11 is not possible. By the allocation based on the data amounts, the common memory M11 can be effectively used.

In step ST1606, the data transfer device 1501 transfers the coded data at the respective stages in the block BK1 from the compressed image memory M1 to the common memory M11 based on the positional information stored in the common memory M12. The first-stage coded data is stored in the memory region a11, the second-stage coded data is stored in the memory region a12, the third-stage coded data is stored in the memory region a13, the fourth-stage coded data is stored in the memory region a14, and the fifth-stage coded data is stored in the memory region a15.

The analyzer 1511 increments the positional information by the number of bytes of the coded data transferred to the common memory M11. By this increment, the positional information stored in the common memory M12 indicates the number of bytes from the head of the compressed image data at which the coded data at each stage in the block BK2 as the next block starts.

In step ST1607, the selector 103 supplies the first-stage coded data in the block BK1 (BK1-EC1) stored in the memory region a11 of the common memory M11 to the Huffman decoder 102. The Huffman decoder 102 Huffman-decodes the first-stage coded data in the block BK1 (BK1-EC1) with reference to the Huffman table stored in the coding table TB1. By this decoding, first-stage DCT coefficient data in the block BK1 (BK1-C1) is obtained.

In step ST1608, the selector 109 of the combiner 104 transfers the first-stage DCT coefficient data in the block BK1 (BK1-C1) supplied from the Huffman decoder 102 to a memory region d1 of the coefficient memory M4. The first-stage DCT coefficient data in the block BK1 (BK1-C1) is thus stored in the memory region d1.

In step ST1609, whether or not DCT coefficient data at all stages in the block BK1 have been stored in the coefficient memory M4 is determined. If DCT coefficient data at all stages have been stored, the process proceeds to step ST1610. Otherwise, the process returns to step ST1607. In this case, since DCT coefficient data at all stages have not yet been stored, the process returns to step ST1607. As in Embodiment 1, the series of processing in steps ST1607 to AT1609 are repeated, to store second-stage to fifth-stage DCT coefficient data in the block BK1 in memory regions d2 to d5 and thereby attain DCT coefficient data in the block BK1 (BK1-C1 to C64). Thereafter, as a result of the determination in step ST1609, the process proceeds to step ST1610.

In step ST1610, the inverse quantizer 105 inverse-quantizes the DCT coefficient data in the block BK1 (BK-C1 to C64) supplied from the combiner 104 based on the quantization value stored in the quantization table TB2.

In step ST1611, the inverse DCT device 106 performs inverse DCT for the DCT coefficient data in the block BK1 (BK-C1 to C64) inverse-quantized by the inverse-quantizer 105. Thus, decompressed image data for the block BKl is attained.

In step ST1612, the color space converter 107 converts the components of the color space of the decompressed image data in the block BK1 supplied from the inverse DCT device 106 from the luminance components and the color-difference components (Y, U, V) to the three primary components (R, G, B).

In step ST1613, the color reducer 108 reduces the number of colors of the decompressed image data in the block BK1. In this processing, a technique such as error dispersion is employed so that the difference in the appearance of an image is less conspicuous between before and after the reduction of the number of colors.

In step ST1614, the decompressed image data in the block BK1 from the color reducer 108 is stored in the decompressed image memory M2. In step ST1616, whether or not decompressed image data in all blocks BK1 to BK16 have been stored in the common memory M12 is determined. If decompressed image data in all blocks BK1 to BK16 have been stored, the process is terminated. Otherwise, the process returns to step ST1607. In this case, since decompressed image data in the blocks BK2 to BK16 have not yet been stored, the process returns to step ST1607.

In step ST1615, the decompressed image data in the block BK1 stored in the common memory M12 is transferred to the decompressed image memory M2. In step ST1617, whether or not decompressed image data in all blocks BK1 to BK16 have been stored in the decompressed image memory M2 is determined. If decompressed image data in all blocks BK1 to BK16 have been stored, the process is terminated. Otherwise, the process returns to step ST1606. In this case, since decompressed image data in the blocks BK2 to BK16 have not yet been stored, the process returns to step ST1606.

In step ST1606, the data transfer device 1501 transfers coded data at the respective stages in the block BK2 from the compressed image memory M1 to the memory regions a11 to a15 of the common memory M11 based on the positional information stored in the common memory M12. Thereafter, substantially the same series of processing as those for the block BK1 described above are performed, and decompressed image data in the block BK2 is transferred to the decompressed image memory M2.

For the blocks BK3 to BK16, substantially the same series of processing as those for the blocks BK1 and BK2 described above are performed, and decompressed image data in blocks BK3 to BK16 are stored in the decompressed image memory M2. The process is then terminated as a result of the determination in steps ST1616 and ST1617.

Decompressed image data of the progressive-coded compressed image data is thus obtained. In the display of the decompressed image data, as in the display of decompressed image data of sequential-coded compressed image data, the decompressed image data in the blocks BK1 to BK16 are sequentially displayed.

Thus, in the image processor of Embodiment 2, decompression of progressive-coded compressed image data can be executed by two processors, that is, the CPU 1500 and the DSP 1510. In addition, with the existence of the common memories M11 and M12, the DSP 1510 does not need to have a memory for storing compressed image data. This can reduce the memory capacity required for the DSP 1510.

As in Embodiment 1, the capacity of the memory M4 required for combining DCT coefficient data at the respective stages may only be large enough to store DCT coefficient data for one block. With this small memory capacity requirement, the image processor of this embodiment can be used as an image processor mounted in small-type portable terminals such as cellular phones. It is needless to mention that the image processor of this embodiment can also be used as an image processor for other apparatus.

(b) Decompression of Sequential-Coded Compressed Image

Figure 17:
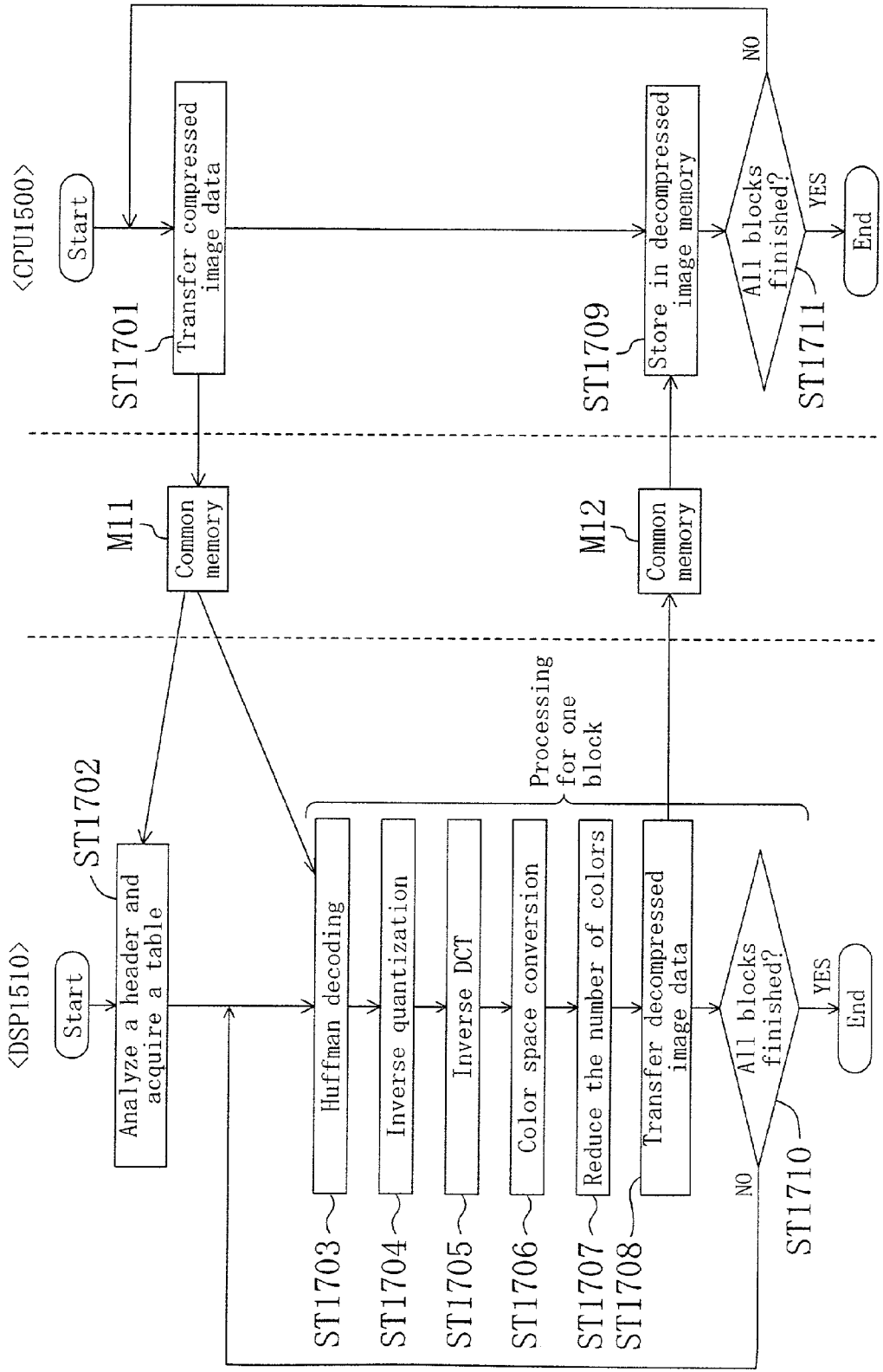
FIG. 17 is a flowchart showing a procedure of decompression of sequential-coded compressed image data.

FIG. 17 is a flowchart showing a procedure of decompression of the sequential-coded compressed image data. Note that in FIG. 17, steps ST1701, ST1709, and ST1711 belong to processing executed by the CPU 1500, while steps ST1702 to ST1708 and ST1710 belong to processing executed by the DSP 1510.

The CPU 1500 retrieves compressed image data externally (by accessing the Internet, for example), and stores the data in the compressed image memory M1.

In step ST1701, the CPU 1500 transfers the compressed image data stored in the compressed image memory M1 to the common memory M11.

In step ST1702, the analyzer 1511 analyzes the frame header of the compressed image data (see FIG. 4) stored in the common memory M1, to obtain information such as the coding scheme (progressive-coding or sequential-coding) and the image size. The compressed image data is thus identified as sequential-coded data in this case. The analyzer 1511 also extracts a quantization value and a Huffman table from the table data of the compressed image data (see FIG. 4), and transfers the quantization value to the quantization table TB2 and the Huffman table to the coding table TB1.

In step ST1703, the analyzer 1511 supplies coded data in the block BK1 (BK1-EC1 to EC64) to the Huffman decoder 102. The Huffman decoder 102 Huffman-decodes the coded data in the block BK1 (BK1-EC1 to EC64) with reference to the Huffman table stored in the coding table TB1. By this decoding, DCT coefficient data in the block BK1 (BK1-C1 to C64) are obtained.

In step ST1704, the selector 109 of the combiner 104 sequentially transfers the DCT coefficient data in the block BK1 (BK1-C1 to C64) supplied from the Huffman decoder 102 to the memory regions d1 to d5 of the coefficient memory M4. The inverse quantizer 105 inverse-quantizes the DCT coefficient data C1 to C64 in the block BK1 stored in the coefficient memory M4 based on the quantization value stored in the quantization table TB2.

In step ST1705, the inverse DCT device 106 performs inverse DCT for the DCT coefficient data C1 to C64 in the block BK1 inverse-quantized by the inverse quantizer 105. By this processing, decompressed image data in the block BK1 is attained.

In step ST1706, the color space converter 107 converts components of the color space of the decompressed image data in the block BK1 supplied from the inverse DCT device 106 from the luminance components and the color-difference components (Y, U, V) to the three primary components (R, G, B).

In step ST1707, the color reducer 108 reduces the number of colors of the decompressed image data in the block BK1. In this processing, a technique such as error dispersion is employed so that the difference in the appearance of an image is less conspicuous between before and after the reduction of the number of colors.

In step ST1708, the decompressed image data in the block BK1 from the color reducer 108 is transferred to the common memory M12. In step ST1710, whether or not decompressed image data in all blocks BK1 to BK16 have been transferred to the common memory M12 is determined. If decompressed image data in all blocks BK1 to BK16 have been transferred, the process is terminated. Otherwise, the process returns to step ST1703. In this case, since decompressed image data in the blocks BK2 to BK16 have not yet been transferred, the process returns to step ST1703.

In step ST1709, the decompressed image data in the block BK1 stored in the common memory M12 is transferred to the decompressed image memory M2. In step ST1711, whether or not decompressed image data in all blocks BK1 to BK16 have been stored in the decompressed image memory M2 is determined. If decompressed image data in all blocks BK1 to BK16 have been stored, the process is terminated. Otherwise, the process returns to step ST1701. In this case, since decompressed image data in the blocks BK2 to BK16 have not yet been stored, the process returns to step ST1701.

Thereafter, by performing substantially the same series of processing as those for the block BK1 described above, decompressed image data in the blocks BK2 to BK16 are stored in the decompressed image memory M2.

Decompressed image data of the sequential-coded compressed image data is thus attained.

<Effect>

In the image processor of Embodiment 2 of the present invention, decompression of progressive-coded compressed image data can be executed by two processors, that is, the CPU 1500 and the DSP 1510. In addition, with the existence of the common memories M11 and M12, the DSP 1510 does not need to have a memory for storing compressed image data. This can reduce the memory capacity required for the DSP 1510.

The capacity of the memory M4 required for combining DCT coefficient data at the respective stages may only be large enough to store DCT coefficient data for one block. With this small memory capacity requirement, the image processor of this embodiment can be used as an image processor mounted in small-type portable terminals such as cellular phones.

Inverse DCT is performed after the combination of DCT coefficient data at the respective stages. This reduces the operation amount of the inverse DCT.

In this embodiment, DCT/inverse DCT was adopted as orthogonal transformation/inverse orthogonal transformation, and Huffman coding/decoding was adopted as entropy coding/decoding. Alternatively, other schemes of orthogonal transformation/inverse orthogonal transformation and entropy coding/decoding may be adopted.

In this embodiment, as the method for implementing progressive-coding, quantized DCT coefficient data were divided into a plurality of stages based on the frequency. Alternatively, other implementing methods may be employed. For example, bits of quantized DCT coefficient data may be divided into a plurality of stages.

The image processor of Embodiment 2 may not necessarily be constructed by hardware, but can be implemented by software.

As pre-processing prior to the decompression for each block shown in FIG. 16, it is possible to first display image data obtained by decompressing the first-stage coded data in the blocks BK1 to BK16 (rough entire image with low resolution and low gray scaling), and then display decompressed image data obtained by completing the decompression for each block shown in FIG. 16.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. An image processor for decompressing compressed image data, the compressed image data being obtained by dividing an original image into a plurality of blocks, dividing coefficient data obtained by performing orthogonal transformation for each block into a plurality of stages, and entropy-coding the coefficient data for each stage, the image processor comprising:
   a first processor having a compressed image memory for storing compressed image data;
   a second processor; and a common memory accessible from both the first processor and the second processor, wherein the first processor transfers compressed image data stored in the compressed image memory to the common memory, the second processor detects positions at which coded data at respective stages in a certain block are stored from the compressed image data transferred to the common memory, the first processor then transfers coded data at the respective stages from the compressed image memory to the common memory based on the positions detected by the second processor, and the second processor then entropy-decodes the coded data at the respective stages in the certain block transferred to the common memory, combines coefficient data at the respective stages in the certain block obtained by the entropy-decoding to form coefficient data for the certain block, performs inverse orthogonal transformation for the coefficient data, and determines if the plurality of blocks have been stored in a memory.

2. An image processor of claim 1, wherein, when the first processor transfers the coded data at the respective stages from the compressed image memory to the common memory, the first processor allocates memory regions of the common memory to the coded data at the respective stages based on the data amounts of the coded data at the respective stages.

* * * * *